United States Patent [19]
Phillips et al.

[11] Patent Number: 5,198,788
[45] Date of Patent: Mar. 30, 1993

[54] LASER TUNING OF CERAMIC BANDPASS FILTER

[75] Inventors: James R. Phillips; Ali Tootoonchi; John F. Dullea, all of Albuquerque, N. Mex.

[73] Assignee: Motorola, Inc., Schaumburg, Ill.

[21] Appl. No.: 786,611

[22] Filed: Nov. 1, 1991

[51] Int. Cl.$^5$ .............................................. H01P 1/202
[52] U.S. Cl. .................................... 333/207; 333/235
[58] Field of Search ................ 333/202, 204, 205–207, 333/219, 222, 223, 235; 29/600

[56] References Cited

U.S. PATENT DOCUMENTS

| | | | |
|---|---|---|---|
| 4,431,977 | 2/1984 | Sokola | 333/206 |
| 4,800,348 | 1/1989 | Rosar et al. | 333/207 X |
| 4,965,537 | 10/1990 | Kommrusch | 333/202 |
| 5,004,992 | 4/1991 | Grieco et al. | 333/207 X |

FOREIGN PATENT DOCUMENTS 0026104 1/1990 Japan .................................. 333/222

Primary Examiner—Paul M. Dzierzynski
Assistant Examiner—Seung Ham
Attorney, Agent, or Firm—Douglas D. Fekete

[57] ABSTRACT

A laser tuning method for tuning a ceramic passband filter comprises forming an untuned filter that includes at least one metallized element, such as a resonator pad, formed of an undersized metal plate. A thick film of a metal powder paste is applied to the filter adjacent to the undersized plate. The paste film is scanned with a laser beam to sinter the metal particles into an integral plate, thereby adjusting the size and shape of the element to obtain a desired performance characteristic. In one aspect of this invention, an output signal in response to a test signal is monitored while laser scanning the paste film, whereupon the laser beam is discontinued when the desired characteristic has been obtained.

14 Claims, 1 Drawing Sheet

LASER TUNING OF CERAMIC BANDPASS FILTER

BACKGROUND OF THE INVENTION

This invention relates to a method for tuning a ceramic bandpass filter and, more particularly, to such method that employs selective laser sintering of a metallic paste to adjust a metallized element of the filter to obtain a desired bandpass characteristic.

In a radio receiver or the like, a ceramic bandpass filter is utilized to selectively pass a radio frequency signal having a frequency within a predetermined band referred to as the passband, and to shunt unwanted signals having frequencies outside the passband. A typical filter comprises a ceramic block including one or more elongated cavities extending from a top surface. Metal plates are applied to discrete regions of the block surface to form the necessary electrically conductive elements. These elements include an input pad, an output pad and a ground plate. The cavity is also coated with a metal plate to form a resonator. The resonator includes a resonator pad applied to the top surface of the block and connected to the plate within the cavity. In operation, the resonator is capacitively coupled to the ground plate to shunt the unwanted signals.

The performance characteristics of the filter is determined by the design of the ceramic block and the metal plated elements. For example, the boundaries of the passband are related to the size and shape of the resonator pad. Moreover, the properties are sensitive to slight variations in the dimensions of the blocks and the plates, even within the tolerances normally achievable in mass production. Thus, in mass production, each filter is individually tuned to adjust the properties of the passband. In common practice, tuning is accomplished by forming oversized plates and removing surplus metal while monitoring the output from a test signal applied to the filter until the desired passband characteristics are obtained. The excess metal is removed manually by an operator using a hand-held grinding tool. Because manual grinding is tedious and requires a high level of skill, such tuning is labor intensive and costly. The removal of too much metal by overgrinding results in properties adjusted beyond desired tolerances and thus produces a defective filter that cannot be readily repaired except typically by stripping and replating. Furthermore, by its nature, the grinding operation does not lend itself to automation and is constrained by the limits of operator dexterity in the precision with which filter characteristics may be tuned. For all these reasons, there remains a need for a method for tuning a ceramic bandpass filter that does not rely upon manual grinding of oversized pads to adjust the desired properties of the passband.

SUMMARY OF THE INVENTION

This invention contemplates a method for tuning a ceramic bandpass filter that includes fabricating an untuned filter having an undersized metal plate corresponding generally to a strategic element of the filter, but having a size and shape insufficient to obtain a desired performance characteristic, and laser sintering a metal paste to augment the plate to achieve the desired characteristic.

Accordingly, the method of this invention is applied to a ceramic bandpass filter of the type that comprises a ceramic block and at least one element formed of a metal plate applied to a discrete surface region of the block. The filter is tuned to selectively pass a radio frequency signal having a predetermined characteristic. The method comprises fabricating the filter in an untuned condition that includes an undersized metal plate corresponding generally to the element. A thick film metal paste is applied to the untuned filter adjacent to the undersized plate. The paste comprises metal particles in an expendable binder. An input signal is applied to the filter and produces an output signal that is monitored in a manner that allows the characteristic to be measured. The applied paste is scanned with a laser beam to vaporize the binder and to sinter the particles into an integrally bonded metal film. The laser beam scans a pattern that contacts the preformed plate, so that the nascent metal plate is connected thereto and increases the size and shape of the element. As the laser beam scans the paste, the output signal is monitored until the measured value of the characteristic corresponds to a predetermined value, whereafter laser scanning is discontinued.

Therefore, this invention provides a laser tuning method that adds metal to an undersized preformed plate on a filter, in contrast to methods that remove metal from an oversized plate. This is accomplished by laser sintering metal paste to adjust the size and shape of the element to achieve a desired performance characteristic. The method of this invention is particularly well suited for automation that scans a preformed filter following a programmed pattern while monitoring bandpass characteristics from an applied test signal and discontinues scanning upon obtaining a predetermined value. This not only permits computer controlled precision of the tuning operation but eliminates the tedious and labor-intensive grinding operations heretofore employed to adjust an oversized plate. Furthermore, in the event of a tuning error, the method of this invention tends to produce an oversized plate which may then be readily repaired by removing metal to again produce an undersized plate and repeating the method of the invention to adjust the plate size. This is particularly advantageous in the manufacture of more complicated multiresonator filters that may require interrelated adjustments to several metal plate elements to tune a desired combination of characteristics.

DESCRIPTION OF THE DRAWINGS

The present invention will be further illustrated with reference to the accompanying drawings wherein.

DETAILED DESCRIPTION OF THE INVENTION

Figure 1:
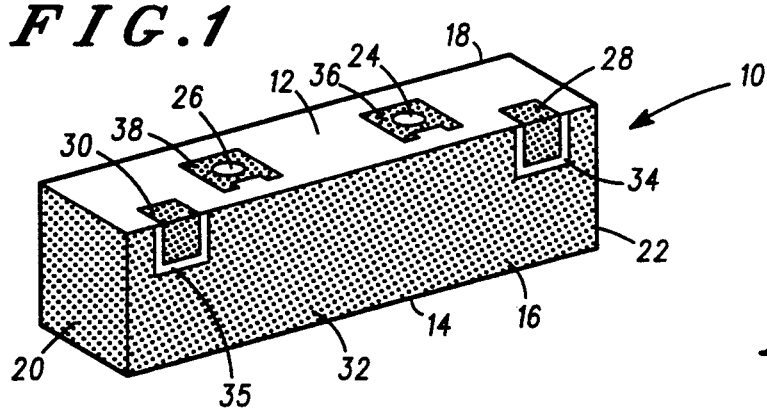
FIG. 1 is a perspective view of a ceramic bandpass filter adapted for tuning by the method of this invention.
Figure 2:
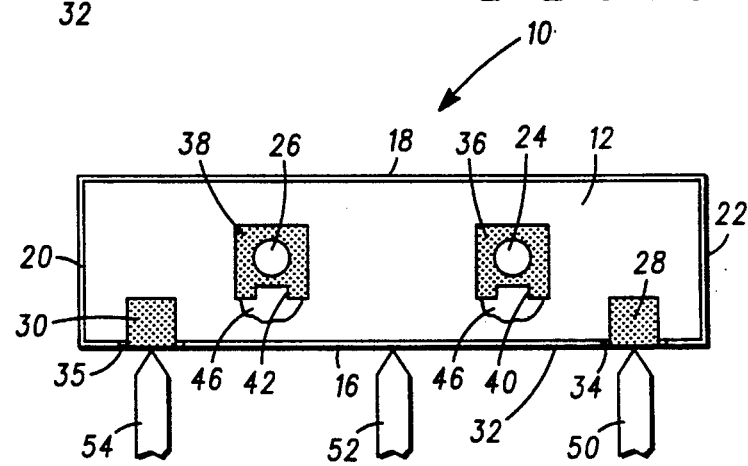
FIG. 2 is a plan view of the top surface of the filter in FIG. 1.

In a preferred embodiment, referring to the Figures, the method of this invention is employed to tune a ceramic bandpass filter 10. Filter 10 is formed of a metal-plated sintered ceramic block, and includes a top face 12, a bottom face 14, side faces 16 and 18, and end faces 20 and 22. Filter 10 further comprises parallel cylindrical bores that openly extend between top face 12 and bottom face 14. Regions of the block surfaces are coated with silver plates to form metallic elements of the filter. Plate thickness is exaggerated in the Figures for purposes of illustration. The plated elements include an input pad 28 and an output pad 30 that wrap around between top face 12 and side face 16. The wraparound configuration is particularly adapted for surface mount connections when the filter is subsequently incorporated into an electronic package. The side faces 16 and 18, bottom face 14 and end faces 20 and 22 are coated with a continuous metal plate forms a ground element 32. At face 16, ground plate 32 is separated from input pad 28 and output pad 30 by bare ceramic regions 34 and 35 to prevent electrical short circuiting. Cavities 24 and 26 are coated with a metal plate that extends onto top face 12 to include resonator pads 36 and 38, which are surrounded by bare ceramic surface. In accordance with this preferred embodiment, pads 36 and 38 include notches 40 and 42 for tuning the filter.

Filter 10 is fabricated by forming an elongated, bored ceramic block and thereafter selectively coating the surface regions with the metal plates. The block is composed of a suitable dielectric metal oxide, such as barium titanate. Ceramic powder is compacted and sintered to form the block including the cavities 36 and 38. The plated elements are preferably composed of silver metal. Both the preformed plate and the metal subsequently added for tuning in accordance with this invention is derived from a commercially available paste composed of a fine silver powder suspended in a volatile solvent that also includes a vaporizable organic binder. A preferred paste contains greater than 80 weight percent silver powder. A preferred solvent comprises a mixture of xylene, mineral spirits and pine oil blended to obtain a suitable viscosity for spraying or printing, and commonly constitutes between about 5 and 10 percent of the paste. A preferred binder is ethyl cellulose or the like added in an amount between about 1 and 5 percent. The paste also preferably includes minor additions of organic agents to promote paste stability and also a glass additive to enhance metal ceramic bonding. A thick film of the paste is applied to the major surfaces, except faces 12 and 16, and also to cavities 24 and 26 by spraying. Following wiping to remove overspray, the paste thick film is screen printed in the desired pattern onto top surface 12 and side surface 16. The paste is dried to remove solvent and thereafter fired at a temperature of about 890° C. to vaporize the binder and to sinter the silver particles into an integral plate. In this manner, the filter 10 is formed to include generally the several premetallized elements, but still requires tuning to optimize performance within precise, specified parameters.

For operation, input pad 28 is connected to a source, such as an antenna, that supplies an electrical signal that includes frequencies within a radio frequency spectrum. Output pad 30 is connected, for example, to an electrical circuit, and emits an output signal that is limited to frequencies within a relatively narrow passband. Resonator cavities 24 and 26 are capacitively coupled to the ground element 32 through the dielectric ceramic to shunt frequencies of the input signal outside the passband. The performance of the filter, particularly as indicated by the characteristics of the passband, are determined by several factors including the composition of the ceramic, the size and shape of the block and the size and shape of the metal plates. Of particular significance to this embodiment, the passband characteristics are dependent upon the size and shape of the resonator pads 36 and 38.

Figure 3:
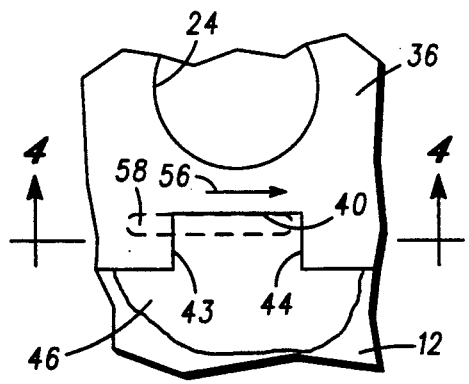
FIG. 3 is an enlarged partial view of the filter surface in FIG. 2 showing a portion of the resonator pad adapted for tuning in accordance with this invention.
Figure 4:
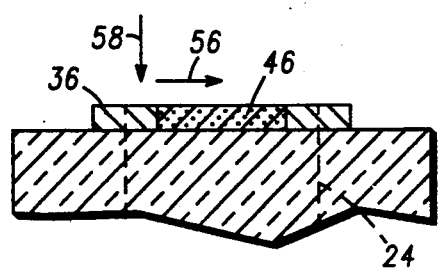
FIG. 4 is a cross-sectional view of the resonator pad in FIG. 3 taken along the lines 4—4 in the direction of the arrows.

Thus, in accordance with this embodiment, filter 10 is formed to include generally the features shown in FIG. 1, and is tuned to precisely define a frequency range of the passband frequencies by increasing the size of resonator pad 36. Referring in particular to FIG. 3, resonator pad 36 is preformed to define a notch 40 that includes opposite edges 43 and 44, spaced apart by a base ceramic surface region. The preformed notch exposes a bare ceramic surface. A metallic paste film 46 is applied, for example, by printing, to the bare ceramic surface top face 12 to cover the exposed ceramic surface within notch 40. The paste is composed of silver particles suspended in a solvent vehicle with vaporizable organic binder and is similar to the paste used to produce the preformed plates. Following application of the paste, filter 10 is mounted into a fixture that includes pins 50, 52 and 54. Pin 50 contacts input pad 28 and is connected to a source of a broad spectrum radio frequency test signal. Pin 54 contacts output pad 30 and is connected to a network analyzer that measures signal intensity as a function of frequency within a range extending about a desired passband. Pin 52 contacts ground elements 32 and is grounded. A continuous wave laser beam produced by a carbon dioxide laser is directed perpendicular to top surface 12, as indicated by arrow 58, onto a zone of pad 36 adjacent edge 43. The sintered plate is sufficiently reflective to minimize any effect by the beam upon the premetallized zone. The beam is then scanned in the direction of arrow 56 onto the paste adjacent edge 43. Unlike the metal plate, the paste absorbs the light and is thereby heated to a temperature effective to vaporize the organic binder and sinter the metal particles into a continuous coating. Scanning rate and beam intensity are adjusted to sinter the particles without overheating to cause incipient melting that would result in coalescing of molten silver. Because of the proximity of the nascent plate produced by the laser sintering to the preformed plate, the metal is sintered into a singular pad, thereby increasing the size of pad 36. As the laser scans the paste, the characteristics of the passband are monitored using the network analyzer until a desired characteristic is obtained. By way of example, signal intensity may be measured at a frequency that corresponds to a desired upper limit for the passband. As the laser scans the paste, the addition of sintered metal to the resonator pad may cause the intensity at the upper limit to decrease. After sufficient metal is added to reduce the intensity below a predetermined value, the laser beam is discontinued. In this manner, the upper limit of the passband is more precisely defined.

The relationship between increased resonator pad size and upper passband frequency in this embodiment is by way of example, it being understood that the particular relationship between the resonator pad size and passband characteristics is dependant upon details of a particular filter design. In prior practice, it is common to initially apply a resonator pad that is oversized and to remove metal while monitoring passband characteristics for fine tuning. It is believed that addition of metal to an undersized pad has a generally opposite effect upon passband characteristics from the removal of metal from an oversized pad. Thus, the method of this invention may be readily adapted for tuning filters of an existing design by reducing the size of the premetallized region and monitoring similar properties while adding metal to the pad.

In any event, in accordance with this method, laser scanning of the paste adjacent the resonator pad is continued until a desired measured value is obtained for a selected passband characteristic. The laser may be programmed to scan a path that overlaps the pad 36 and adjacent edge 44, and may scan more than one lap between the edges, for example, in a zig-zag path. Thereafter, laser irradiation of the paste is discontinued, for example, by switching off the laser device. It is a significant advantage of the method of this invention that the duration of the laser beam may be controlled by a signal from the network analyzer indicating that a predetermined value has been obtained, in contrast to the response time of an operator visually monitoring the analyzer while performing a manual operation, thereby leading to more precise tuning of the filter.

In a similar manner, pad 38 may be adjusted by laser scanning thick film paste 46 within notch 42 to tune another selected characteristic.

Therefore, the method of this invention produces a finely tuned filter by augmenting the size and shape of an undersized metal plate element. While the nascent plate formed by laser sintering needs to be connected to the premetallized plate, the presence of unsintered paste proximate to the pad does not significantly effect filter performance and does not interfere with precise monitoring of the passband characteristics. Following tuning, it is preferred to remove excess paste, by solvent wiping, to improve product appearance and reclaim unused precious metal powder. Also, in contrast to grinding techniques, laser sintering does not produce metal-bearing airborne offal and minimizes precious metal required to complete the filter.

In the described embodiment, the method of this invention is employed to tune a filter by increasing the size of a resonator pad. Alternately, filter performance is dependant upon the size and shape of other metal plate features including the input pad, the output pad and the ground plate. These may be modified to adjust resonant frequency bandwidth. transmission zero, return loss, insertion loss and stop band frequency. Thus, depending upon particular filter design, the method of this invention may be applied to tune any of the several metal plate elements to optimize performance characteristics controlled thereby.

While this invention has been disclosed in terms of a filter formed of a particular ceramic and having silver plated elements, it is applicable to tuning filters formed of any suitable dielectric material and having metal plated elements formed of any suitable metal. In particular, commercial pastes containing powders composed of gold, copper, nickel and tin-lead alloy are available and may be useful for forming metallized elements on a ceramic block filter that are adjustable by laser sintering in accordance with the method of this invention. The preformed plates may be applied by any suitable techniques, including sputtering, electroplating or electroless plating.

While this invention has been described in terms of certain embodiments thereof, it is not intended that it be limited to the above description but rather only to the extent set forth in the claims that follow.

The embodiments of this invention in which an exclusive property or privilege is claimed are defined as follows:

We claim:

1. A laser tuning method for tuning a ceramic bandpass filter to selectively pass a radio frequency signal having a desired measurable characteristic, said filter comprising a ceramic block having a cavity forming a resonator and at least one element formed of a metal plate applied to a surface region of said block and having a size and shape such that the characteristic is related to the size and shape of the plate, said method comprising the steps of fabricating an untuned filter comprising said block and an undersized metal plate corresponding generally to said element and having a size and shape insufficient to obtain the desired characteristic, applying a thick film of a metal powder paste to said block adjacent to the undersized metal plate, said paste being composed of metal particles in an expendable binder, applying an input signal to the untuned filter, monitoring an output signal from the filter in response to said input signal to measure a value of the characteristic, scanning said paste film with an laser beam to vaporize the binder and to sinter the metal particles to form an integral plate, said laser beam scanning a path in contact with the undersized plate to increase the size and shape of the element, and discontinuing said laser scanning upon achieving a desired measured value for the characteristic and thereby producing a tuned filter.

2. The method of claim 1 further comprising cleaning residual metal powder paste from said tuned filter following said laser scanning.

3. The method of claim 1 wherein the metal powder paste comprises silver particles sinterable to form a substantially silver plate.

4. The method of claim 1 wherein the thick film is applied to a bare ceramic surface region of said ceramic block adjacent to the undersized plate and further wherein the method comprises scanning a path across the film overlying said bare ceramic surface region.

5. A laser tuning method for tuning a ceramic bandpass filter to selectively pass a desired radio frequency signal having a measurable characteristic that is a predetermined value, said filter comprising a ceramic block having a top surface and an elongated cavity extending from the top surface, said filter further comprising a strategic element formed of a metal plate applied to discrete surface region of said block and having a size and shape related to the characteristic, said element being selected from the group consisting of an input pad, an output pad spaced apart from the input pad, a resonator pad at the top surface about the cavity and comprising a resonator element extending within said cavity, and a ground element capacitively coupled to the resonator element for shunting signals other than the desired signal, said method comprising the steps of fabricating an untuned filter comprising said block and metal plate generally corresponding to said element, said untuned filter comprising an undersized plate corresponding to said strategic element and having a size and shape insufficient to obtain the predetermined value, applying a thick film of a metal powder paste to the untuned filter adjacent to said undersized plate, said paste comprising metal particles in an expendable binder, applying a radio frequency signal to the input pad, monitoring an output signal at the output pad to measure the value of the characteristic, scanning the paste film with a laser beam having an intensity effective to vaporize the binder and to sinter the metal particles to form an integral plate, said laser scanning a path extending from said undersized plate onto the film to sinter additional metal thereto and to thereby increase the size and shape of the plate, continuously monitoring the output signal during the laser scanning to determine the measured value of the characteristic, and discontinuing said laser scanning when the measured value is equal to said predetermined value to obtain a tuned filter.

6. The method of claim 5 further comprising cleaning residual metal powder paste from said filter following said laser scanning.

7. The method of claim 5 wherein the metal paste comprises silver particles sinterable into a substantially silver plate.

8. The method of claim 5 wherein the strategic element is a said resonator pad and the characteristic is a signal intensity at a predetermined frequency.

9. The method of claim 5 wherein the paste film is applied to a bare ceramic surface region of the ceramic block adjacent to the undersized plate 10. The method of claim 5 wherein laser scanning comprises directing the laser beam onto a zone of the undersized plate and continuously moving the beam relative to the filter along a path that extends onto said paste film to produce a singular and continuous plate.

11. A laser scanning method for tuning a ceramic bandpass filter to selectively pass a radio frequency signal within a passband and further characterized by a limit whereat signal intensity at a selected frequency is less than a predetermined value, said filter comprising a ceramic block having a top surface and an elongated cavity extending from the top surface, and further comprising a resonator element extending within said cavity and comprising a resonator pad at the top surface about the cavity, said resonator element being formed of a metal plate applied to the block, said resonator pad having a size and shape, whereby signal intensity at said selected frequency is directly related to said resonator pad size and shape, said method comprising the steps of fabricating an untuned filter comprising said block and an undersized metal plate generally corresponding to said resonator pad and having a size and shape insufficient to obtain the predetermined value, applying a metal powder paste to a bare ceramic surface region of of said untuned filter adjacent to said undersized plate, said paste comprising metal particles in a vaporizable binder, applying an input radio frequency signal to the untuned filter, monitoring an output signal to determine signal intensity at said passband limit, scanning a path across the filter with a laser beam having an intensity effective to vaporize the binder and to sinter the metal particles to form an integral plate, said path commencing at said undersized plate and extending continuously onto said paste-covered region, whereupon the scanned paste forms a sintered plate that extends integrally from the undersized plate to form the resonator pad, continuously monitoring the output signal during laser scanning to determine signal intensity at the selected frequency, and discontinuing said laser beam when the signal measured intensity is equal to said predetermined value to obtain a tuned filter.

12. The method of claim 11 further comprising solvent cleaning residual metal paste from said filter following tuning.

13. The method of claim 11 wherein the metal paste comprises silver particles sinterable into a substantially silver plate.

14. The method of claim 11 wherein the undersized plate includes a notch including opposite parallel edges spaced apart by a bare ceramic surface region, and wherein the paste is applied to the region between the edges.

* * * * *